(12) United States Patent
Cambou

(10) Patent No.: US 11,736,305 B2
(45) Date of Patent: Aug. 22, 2023

(54) FAST CRYPTOGRAPHIC KEY GENERATION FROM MEMRISTOR-BASED PHYSICAL UNCLONABLE COMPUTED FUNCTIONS

(71) Applicant: Arizona Board of Regents on Behalf of Northern Arizona University, Flagstaff, AZ (US)

(72) Inventor: Bertrand F Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 58 days.

(21) Appl. No.: 17/221,180

(22) Filed: Apr. 2, 2021

(65) Prior Publication Data
US 2021/0314176 A1    Oct. 7, 2021

Related U.S. Application Data

(60) Provisional application No. 63/026,510, filed on May 18, 2020, provisional application No. 63/004,938, filed on Apr. 3, 2020.

(51) Int. Cl.
*H04L 9/32* (2006.01)
*G06F 11/10* (2006.01)

(52) U.S. Cl.
CPC ........ *H04L 9/3278* (2013.01); *G06F 11/1044* (2013.01)

(58) Field of Classification Search
CPC ....... H04L 9/3278; H04L 9/0866; H04L 9/32; G06F 11/1044; G06F 11/10
See application file for complete search history.

(56) References Cited

U.S. PATENT DOCUMENTS

| | | | |
|---|---|---|---|
| 2015/0071432 A1* | 3/2015 | Zhu | G09C 1/00 365/158 |
| 2018/0276072 A1* | 9/2018 | Kodama | G06F 11/1016 |

(Continued)

OTHER PUBLICATIONS

Chen T. et al., "A Robust SRAM-PUF Key Generation Scheme Based on Polar Codes," arXiv:1701.07320 [cs.IT], 2017.

(Continued)

*Primary Examiner* — Quazi Farooqui
(74) *Attorney, Agent, or Firm* — Quarles & Brady LLP

(57) ABSTRACT

Systems and methods for symmetric encryption between a client and a server device include a client device having an array of physical unclonable function devices and a server device storing information sufficient to reconstruct responses of the devices to an applied stimulus such as varying levels of electrical current. The server shares a challenge with the client, which measures characteristics such as electrical resistances for a subset of the devices according to instructions extracted from the challenge. The client measures a corresponding reference device in the array for each device of the subset and assigns a value determined based on a comparison of each device with the corresponding reference device to generate a cryptographic key. The server calculates an expected response of the client to the challenge according to a model of the devices in the array, and uses the calculated response to generate the key independently.

20 Claims, 13 Drawing Sheets

(56) References Cited

U.S. PATENT DOCUMENTS

| | | | |
|---|---|---|---|
| 2020/0052912 A1* | 2/2020 | Lu | G06F 8/65 |
| 2020/0201679 A1* | 6/2020 | Wentz | H04L 63/1433 |
| 2021/0136044 A1* | 5/2021 | Dumitru | H04L 9/0662 |

OTHER PUBLICATIONS

Delvaux, J. et al., "Helper Data Algorithms for PUF-Based Key Generation: Overview and Analysis," IEEE, CAD-ICS, vol. 34, No. 6, 2015.

Falk, R. et al., "New Directions in Applying Physical Unclonable Functions," Securware 2015.

Schulman, A. et al., Poole-Frenkel Effect and Variable-Range Hopping Conduction in Metal/YBCO Resistive Switching Devices, Journal of Applied Physics, p. 118, 2015.

Chiu, F.C. et al., "Review on Conduction Mechanisms in Dielectric Films," Advances in Material Science and Engineering, 2014.

Herder, C. et al., "Physical Unclonable Functions and Applications: A Tutorial," Proceedings of the IEEE, vol. 102, No. 8, pp. 1126-1141, 2014.

Menzel, S. et al., "Switching Kinetics of Electrochemical Metallization Memory Cells," Phys. Chem. Chem. Phys., No. 15, pp. 6945-6952, 2013.

Taniguchi, M. et al., A Stable Key Generation From PUF Responses With a Fuzzy Extractor for Cryptographic Authentications, IEEE Global Conf. on Consumer Electronics (GCCE) 2013.

\* cited by examiner

FAST CRYPTOGRAPHIC KEY GENERATION FROM MEMRISTOR-BASED PHYSICAL UNCLONABLE COMPUTED FUNCTIONS

CROSS-REFERENCE TO RELATED APPLICATIONS

This application claims priority to U.S. Provisional Application 63/004,938 entitled "Fast Cryptographic Key Generation from Memristor-Based Physical Unclonable Computed Functions" and filed on Apr. 3, 2020. This application also claims priority to U.S. Provisional Application 63/026,510 entitled "Cell Pairing for Cryptographic Key Generation from Memristors at Low Power" and filed on May 18, 2020. The disclosures of both provisional applications are incorporated herein by reference.

STATEMENT CONCERNING FEDERALLY-FUNDED RESEARCH

This invention was made with government support under Grant No. SFP1143600 awarded by United States Air Force Research Laboratory and under Contract FA8075-16-D-0001 awarded by the United States Department of Defense. The government may have certain rights in the invention.

BACKGROUND OF THE INVENTION

Information is frequently encrypted to protect against eavesdropping and unauthorized access using encryption schemes based on the use of one or more encryption keys and other keyless encryption schemes. Encryption schemes are frequently used in conjunction with authentication schemes to improve the security of electronic systems. PUF-based security systems use a PUF device as an "electronic fingerprint" unique to a user or device in possession or control of the PUF device, allowing an authentication system to challenge a client seeking authentication, receive a response generated by the client using a PUF device, and then compare the received with a stored response previously received from the client or derived from characteristics of the PUF device and verifying that the two responses match. PUF devices may also be used to generate encryption keys for use with various encryption schemes.

BRIEF SUMMARY

Embodiments of the invention are directed to methods and systems for providing for secure encrypted communications between two devices, for example, a server side device and a client side device. The client side device is in electronic communication with, and preferably includes, an addressable array of PUF devices. In one example, the PUF devices are memristors. The PUF devices each have a unique physical response characteristic in response to stimulus. In the case of a memristor array, for example, each array element will display unique (or nearly unique) I-V characteristics, and specifically, will demonstrate resistance as a function of injected current that is unique to that device. Additionally, the variation in device to device resistance of memristors is quite high. Relying on these properties, embodiments of the invention use a client-side PUF array to generate one or more cryptographic keys that may be used for secure communication. In certain embodiments, each cryptographic key is generated by measuring the resistance, under predetermined voltage or current conditions, for a selected subset of the total number of memristors in the client side PUF array. In alternative embodiments, a key is generated on the basis of the differential resistance between pairs of PUF devices.

In certain embodiments, a matching key is generated at the server side to enable secure, encrypted communications with the client. According to these embodiments, a model of the response of the client's PUF devices under predetermined stimulus (e.g., injected current for the PUF memristors) is built and stored at the server. This model may be built taking sample measurements of the client PUF devices in a secure environment during an enrollment process for the client device. Based on the sampling, model coefficients sufficient to reconstruct the response of each of the client PUF devices are determined and stored. This allows the server to predict the result of the physical measurements being performed by the client during key generation, such that a server side matching key can be generated, but without the requirement that the server store a look up table containing every possible resistance measurement response from the PUF array.

At a high level, inventive embodiments may conduct secure communication by the server selecting a subset of addresses corresponding to PUF devices at the client, using the model to determine the physical response of the selected responses in response to predetermined stimulus (i.e., resistance v. current for each selected device) and then building a server-side key on the basis of the determined resistance values. The server passes a message to the client sufficient to enable the client to determine the identities of the same selected PUF devices and the conditions under which their physical response is to be measured. The client then runs the measurement on the selected devices, generating the client side key. These keys may then be used according to conventional methods to effect communication between the two devices.

In an example embodiment a system is provided. The system includes processor, a physical-unclonable-function ("PUF") array of PUF devices, and memory coupled to the processor. The memory stores non-transitory, processor executable instructions. Executing the instructions causes the processor to receive a challenge message from a server device; extract, from the challenge message, addresses of a set of identified devices of the PUF array; measure resistance values of the set of identified devices; generate a cryptographic key by assigning values corresponding to each identified device based on comparing a resistance value of that identified device to a resistance value of a corresponding reference device; and send a message encrypted with the cryptographic key with the server device. The set of identified devices including at least one reference device.

In another example embodiment, a system includes a processor, and non-transitory memory coupled to the processor. The memory stores data corresponding to addresses in a physical-unclonable-function ("PUF") array of PUF devices. For each address in the PUF array, the memory stores parameters suitable for use as inputs to a model predicting a physical characteristic of a device in response to a predetermined stimulus. The memory also stores executable instructions. Executing the instructions causes the processor generate a set of addresses corresponding to a set of PUF devices in the PUF array; calculate, for each address in the set of addresses, using the model, a physical characteristic of a PUF device identified by that address the PUF array in response to a predetermined stimulus; and generate a cryptographic key on the basis of the calculated physical characteristic for each PUF device of the set of PUF devices.

In another example embodiment a method of generating symmetric cryptographic keys is provided. The method includes generating a first key by determining a plurality of predicted physical response characteristics of a plurality of identified devices in a physical-unclonable-function ("PUF") array of PUF devices in accordance with a mathematical model associating physical response characteristics of PUF devices in the array in response to a predetermined stimulus. The method also includes generating a second key by applying the predetermined stimulus to the plurality of identified devices in the PUF array and measuring a plurality of physical response characteristics of the plurality of identified devices in the PUF array. The devices may be memristors and the physical response characteristics may be electrical resistances developed in response to the application of electrical current to the devices. Generating the first key may include constructing a model by measuring physical response characteristics of the PUF array devices in response to the predetermined applied stimulus. In some embodiments, the first key is generated by a server device and the second key is generated by a client that has the PUF array.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
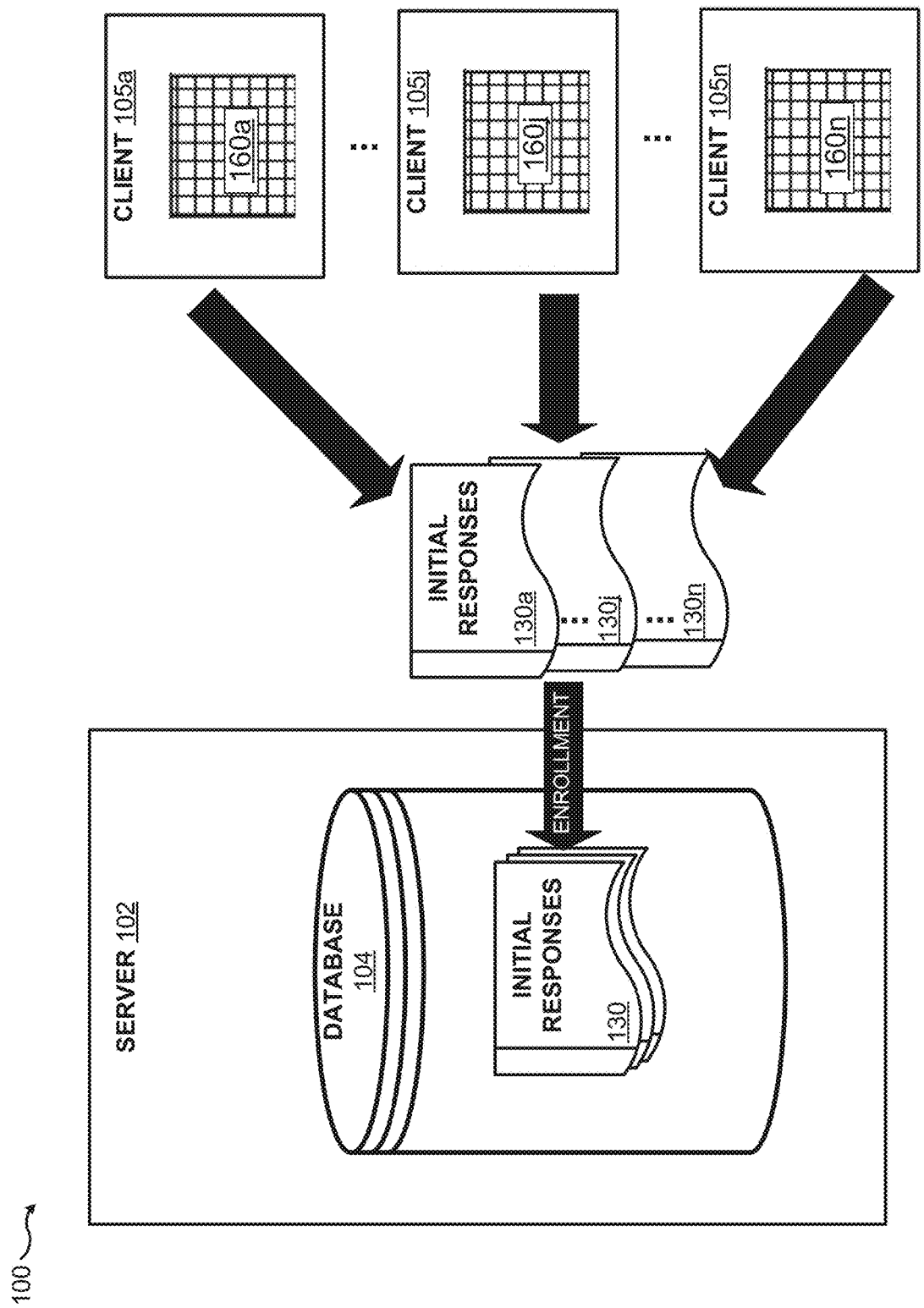
FIG. 1 depicts an enrollment procedure wherein a server issues challenges to clients having PUF arrays and stores responses to those challenges for use in subsequent authentication of the clients, according to one embodiment.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional systems and methods for secure communication frequently rely upon encryption of messages using encryption keys which may be symmetrical or asymmetrical (e.g., in public key encryption schemes). Such key-based encryption schemes have disadvantages. First, keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Accordingly, embodiments disclosed herein address these and other shortcomings by using physical unclonable function (PUF) generators (APGs) to implement encryption schemes where a client with an APG and a server with knowledge of device characteristics of the APG communicate using a shared cryptographic key that is independently generated by both parties, eliminating the need for key exchanges. Such methods are secure, in part, because only a device in possession of the correct PUF array or characteristics of that PUF array (i.e., the client or the server) can identify the correct encryption key.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

In some examples, additional information may be included with or otherwise associated with a challenge. For example, a server may send the error-correction information to a client for use in making generation of the responses more reliable. The instructions may include error correction instructions (sometimes called a "helper" or "helper instructions") and/or masking instructions. Error correction instructions may include a checksum or other error-correcting information for use with error-correcting codes, or other information or instructions used in response generation schemes to be discussed later below. Masking instructions may instruct the client to exclude cells which were previously characterizes as unreliable cells. The client may generate corrected responses which simply exclude measurements of the unreliable cells and/or substitute other cells according method. Alternatively the client may measure additional cells to ensure that the corrected responses are of a specified length. The client may store instructions for selecting the additional cells to measure, or may receive such instructions as part of the error-correction information.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., '0' or '1') after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the '0' or '1' state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same challenge should be similar to each other (and preferably identical).

Additional non-limiting examples of measurable physical characteristics of devices used in PUF arrays which are specifically applicable to embodiments herein are currents induced by an applied input voltage or current, voltages of various circuit elements during operation of a PUF device in response to another stimulus. Further non-limiting examples may include derived quantities such as resistance, conductance, capacitance, inductance, and so on. In certain embodiments, such characteristics of a device may be functions of an input or stimulus level of the device. For example, current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus the relationship between applied current and voltage measured across a memristor (or between applied voltage and current measured through the memristor) is one example of a non-linear transfer function which can be exploited to produce multiple discrete or continuous characteristic values using a single PUF device. Indeed, because the I-V characteristics of memristors are non-linear, a memristor array provides a near infinite space of discrete, but repeatable, physical characteristic measurements that can form the basis of the key generation techniques described herein. At the same time, these I-V characteristics can be accurately statistically modeled, meaning that the measurement response of the cells of a memristor array can be accurately characterized (i.e., predicted), by a small number of coefficients associated with each cell.

According to various embodiments, an encryption protocol enabled by PUFs includes the following stages: (1) Enrollment, (2) Handshaking, (3) Ciphertext generation, and (4) Ciphertext Decryption. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The server 102 manages a database 104 which may be stored in memory of the server 102. The database 104 stores characteristics of the PUF arrays 160 of each client (i.e., "images" of each PUF array 160), which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. Alternatively, the server 102 may be otherwise provided with information suitable to generate the initial challenge responses 130.

A PUF array 160 may form parts of an addressable PUF generator (APG), described further below, which may contain additional processing circuitry and execute instructions for generating challenge responses. Enrollment is performed for each client 105 in a secure environment. After enrollment, the constellation of clients 105 may operate in an insecure environment and communicate with each other over public networks. Secure information needs to be encrypted.

Figure 2:
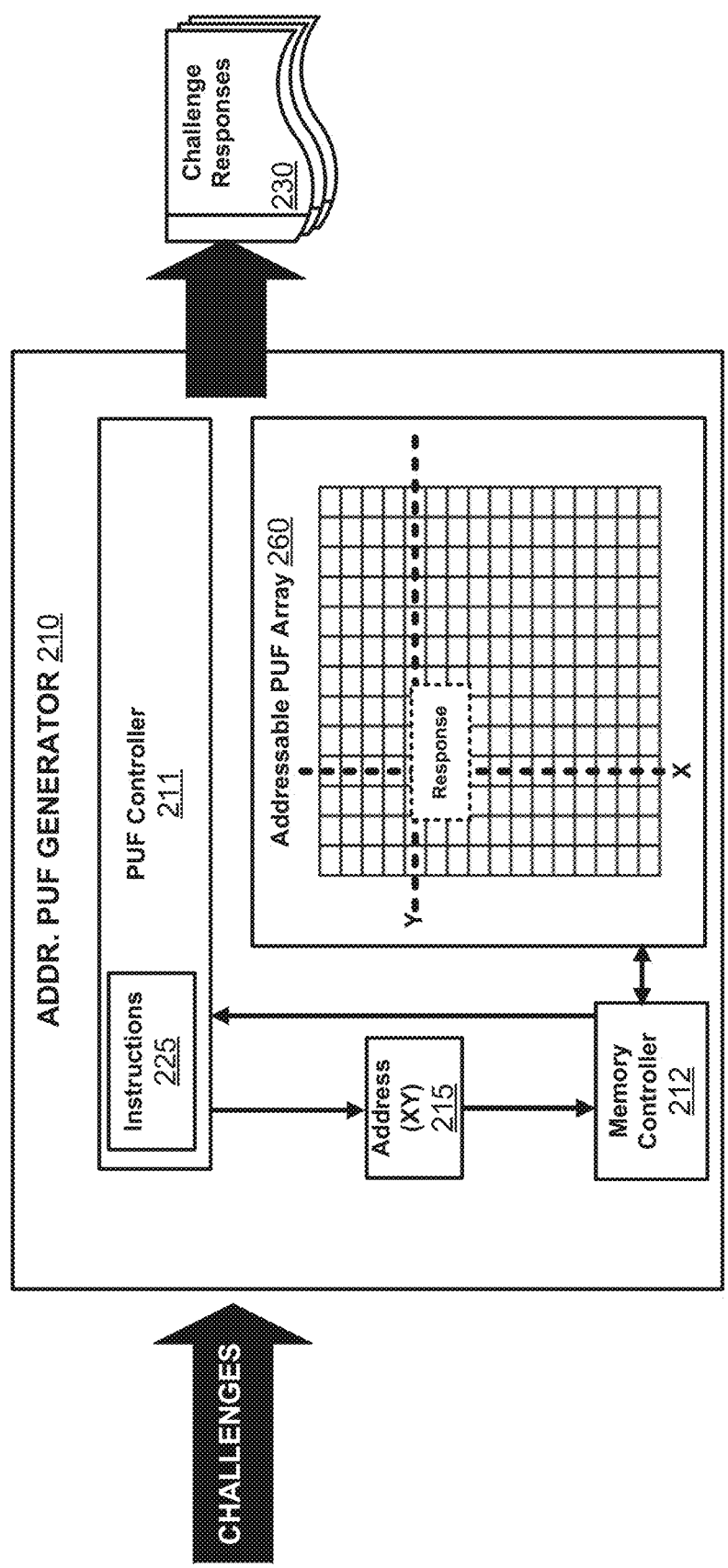
FIG. 2 is a block diagram of an addressable PUF generator (APG).

FIG. 2 illustrates features of an example APG 210 that controls a PUF array 260 (e.g., a PUF array 160) to generate challenge responses (e.g., responses 130). The APG 210 has a PUF controller 211 that implements instructions 225. The instructions 225 may be stored in memory accessible to the PUF controller 211 and/or received from another device. In some embodiments, portions of the instructions 225 may be preconfigured and other portions of the instructions 225 may be received or retrieved on an as-needed basis, as will be described further below. Using the instructions 225, the APG 210 is configured to receive challenges and generate challenge response 230 (e.g., the initial responses 130) using the PUF controller 211 and the instructions 225. In response to receiving a challenge, the APG 210 generates an address (or range of addresses) 215 that identify one or more devices in the PUF array 260 using the instructions 225. The PUF array 260 may be arranged and addressed as a 2D array of cells, as shown, or in any other suitable manner. The PUF devices identified by the address 215 may be accessed via a memory controller 212 and characteristics of those devices may be measured. Using values of the measured device characteristics, the PUF controller may use the instructions 225 to generate an appropriate challenge response 230. Although the APG 210 is depicted as a standalone device, it will be appreciated that an APG may be formed by any suitable arrangement of components configured to perform processes described herein.

In a memristor array suitable for use as a PUF array according to embodiments herein, each memory cell has an active top electrode (the anode) that is susceptible to release positive ions (metallic ions or oxygen vacancies), a neutral bottom electrode (the cathode), and a dielectric allowing the cations to migrate when subjected to an electric field. The voltage needed to form a conductive filament is relatively high (~4V), and the currents flowing through the filaments can exceed 50 µA. At low power (currents in the 100 nA range), the electric fields are too weak to displace the cations. Electron conduction through dielectrics may be approximately described by models such as the Poole-Frenkel or Butler-Volmer models. In the low power conduction mode, the resistance drops quickly with higher injected current and is reversible; the resistances of the cells then return to the same high values after current injection and return to the same values with the same injected current. The flow of electrons circulates through ephemeral dissolvable filaments.

Figure 3:
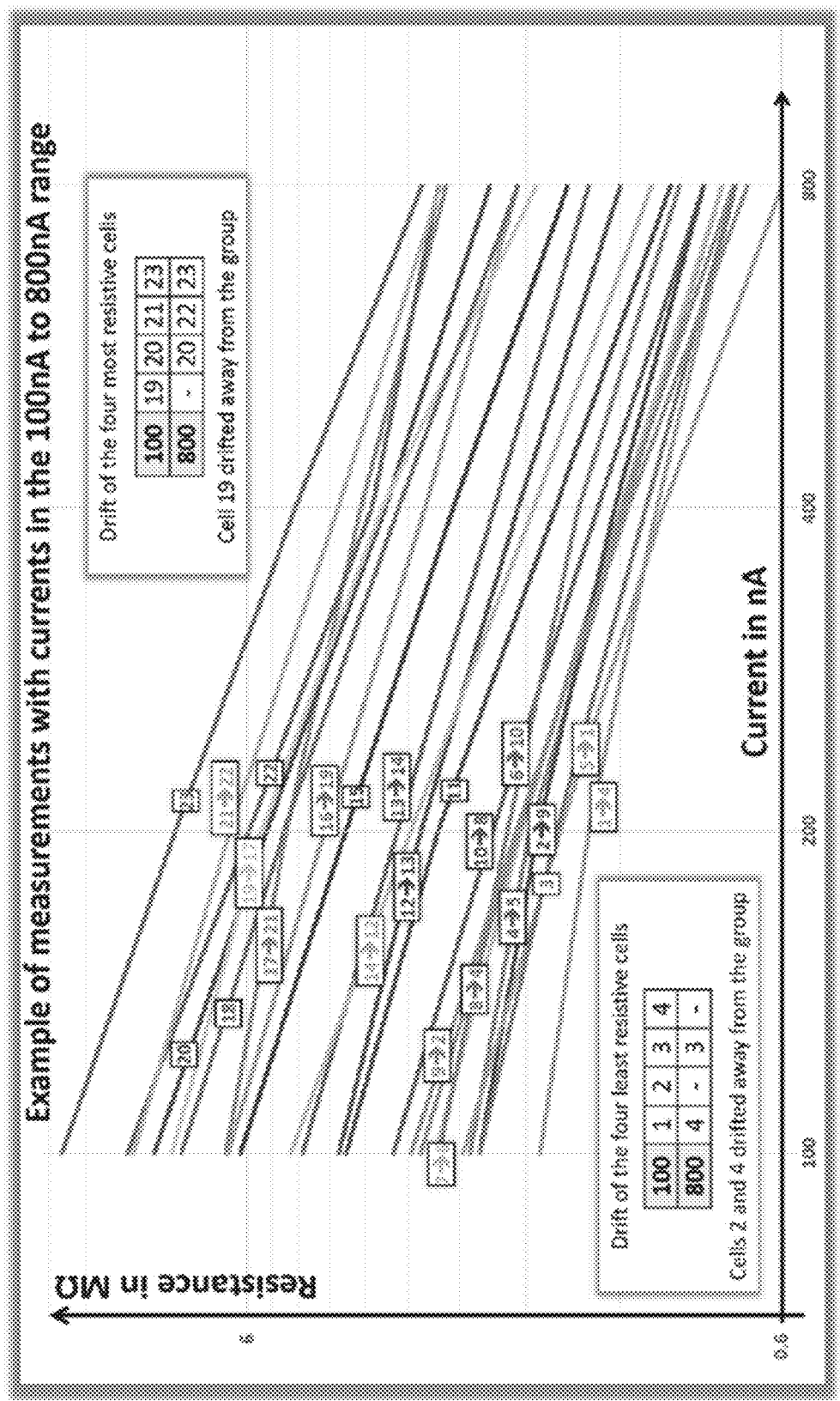
FIG. 3 depicts resistance characteristics of various memristor devices suitable for use in an APG as a function of applied current.

FIG. 3 is a log-log scale plot of the ephemeral resistances in MΩ of twenty-three memristor cells as function of input current ranging between 100-800 nA. The cell-to-cell variations at constant current are significant. For example, at 100 nA, cell-to-cell variations of the resistance are in the range of 2-14 MΩ. This wide range of variability makes such devices attractive for use as PUFs. The relative resistance of the cells are also variable as a function of current. For example, the cell plotted in dark blue in FIG. 3 has the second lowest resistance value when measured at 100 nA; however, the cells are measured at 800 nA, the same cell is now ranked ninth at 800 nA. Meanwhile, the cell having the ninth resistance value at 100 nA, plotted in light brown, is ranked second at 800 nA. This property can be exploited to generate different digital "fingerprints" at different levels of injected current.

Figure 4:
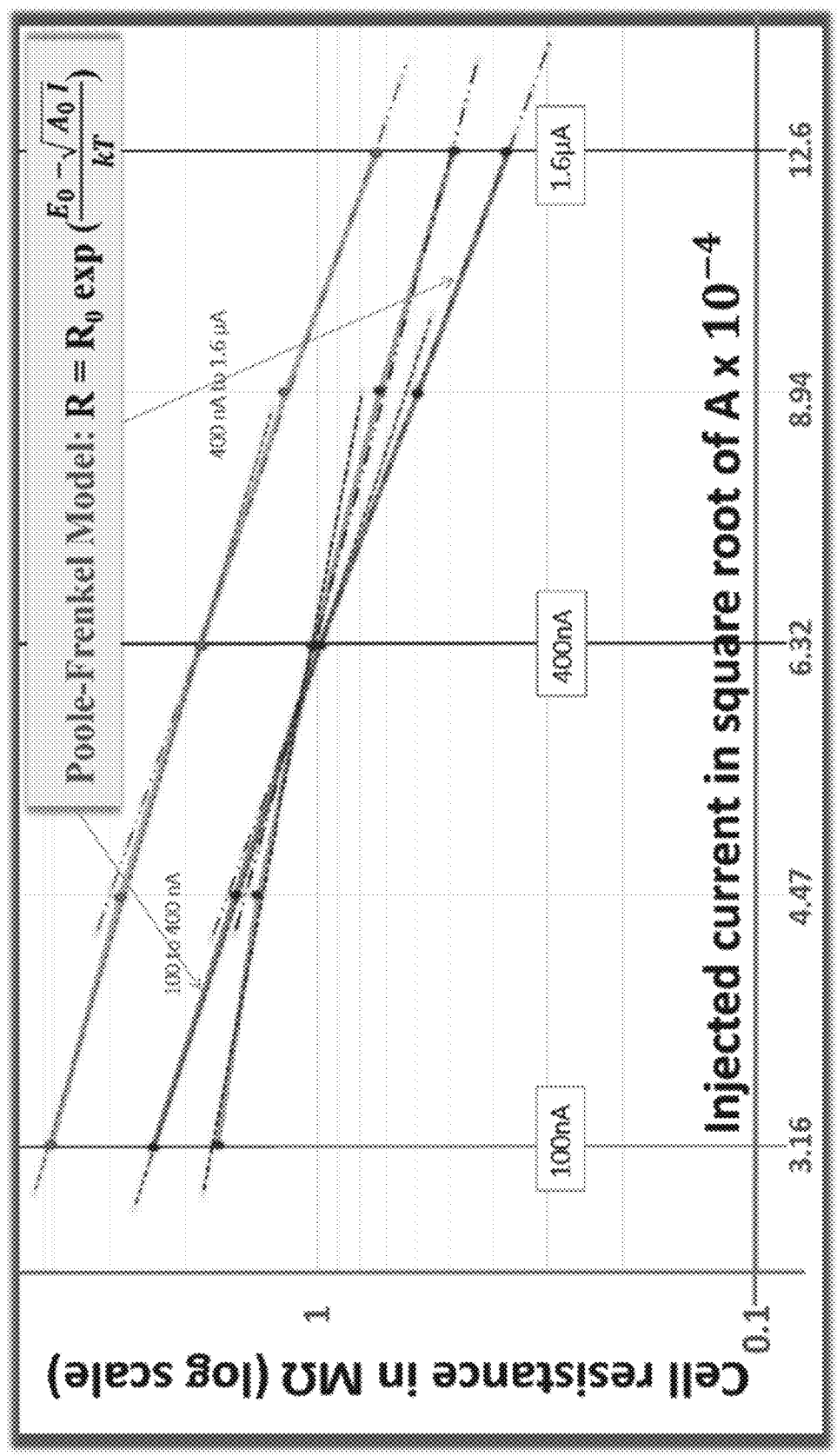
FIG. 4 depicts agreement of the Poole-Frenkel conduction model with measured resistances across a range of 100-1,600 nA for four memristor devices.

FIG. 4 illustrates the experimentally-measured resistance behavior of four memristor devices across a range of input current levels fitted to predictions of the Poole-Frenkel model using best-fit values of the parameters $\{R_0, E_0, A_0\}$. The strong correlation between the modeled current-resistance behavior and the experimentally measure values means that the behavior of an array of memristor may be successfully characterized using a small set of model parameters as well as the ambient temperature. Over a wide range of currents, even better agreement can be achieved by fitting the model over a set of narrower ranges that span the entire range of interest. For example, a memristor may be represented by the parameters $\{R_0, E_0, A_0\}$ over a first current range and by the parameters $\{R_0', E_0', A_0'\}$ over a second current range.

Figure 5:
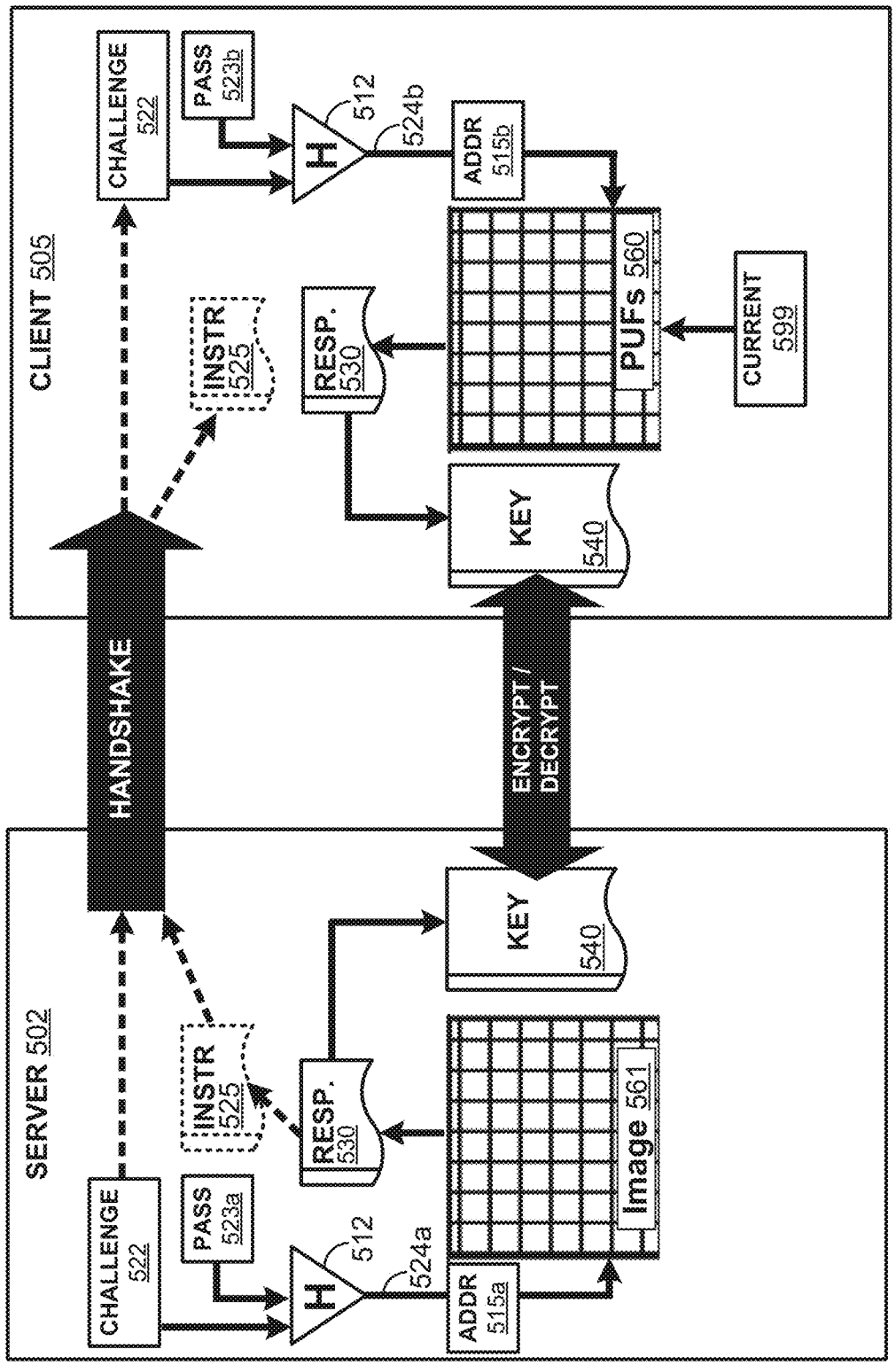
FIG. 5 is a block diagram of a client device with an addressable PUF generator (APG), interacting with a server to independently generate shared encryptions keys.

FIG. 5 illustrates a simplified example embodiment 500 of where a client 505 (e.g., a client 105) communicates with a server 502 (e.g., the server 102). The server 502 and client 505 communicate securely be encrypting communications between them with an encryption key 540 that is independently generated by the client 505 and the server 502 using a challenge 522 issued by the server 502 to the client. The APG 510 (e.g., the APG 210) of the client 505 includes a PUF array 560 which may be accessed by a microcontroller of the APG 510 or other processing circuitry of the client 505. The PUF array 560 of a client 505 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 560) may be unique, even if the PUF arrays are mass-produced by a process designed to produce nominally identical devices. The PUF array 560 (shown as a 2D-array of cells) of a client 505 may be accessed by the client 505 which receives challenges 522 (originating in this example from the server 502).

The APG 510 responds by to challenges 522 by generating responses 530 using measured characteristics of one or more PUF devices within the PUF array 560 identified by the challenge 522 or derived from it using instructions stored by the APG 510. As shown, the challenge 522 (which may be a random number, seed value, or any other suitable string, bitstream or other information) may be used to generate addresses and/or other instructions using a hashing function 521 to yield a message digest 524a on the server side and 524b on the client side. Additional security may be provided by combining the challenge 522 with an optional password such as the password 523a for the server 502 and the password 523b for the client 505. The passwords 523a,b may be the same or different. The message digests 524a,b may be identical or different. For example, the server 502 and the client 505 may use different passwords, producing different message digests for the same challenge. Generally, the client and the server are configured such that address 515a and the address 515b correspond to the same device(s) in the PUF array 560

The APG 510 contains a PUF array 560 that is unique to the client 505. The APG 510 of the client 505 may be used to generate numerous responses 530 unique to that client 505. These responses 530 cannot be replicated by an attacker without physical access to the PUF array 560. The responses 530 may be used as the encryption key 540 or may be otherwise used to derive the encryption key 540. The server 502 may similarly use the image 561 of the PUF array 560 and the challenge to independently generate the key 540 or derive it.

After clients 505 are enrolled with the server 502, embodiments disclosed herein may be utilized to authenticate one or more clients 505 and produce the encryption key 540 which the server 502 a client 505 may use to communicate securely. First, the server 502 and the client 505 enter the Handshaking stage. In the Handshaking stage an objective is for the server 502 to transmit the information needed to identify a particular portion of the PUF array 560 of the client 505. Both the server 502 and the client 505 can independently produce a response to the challenge: the server can lookup information about the PUF array 560 obtained during enrollment (or otherwise supplied to the server 502) and the client 505 can retrieve the same information by using the APG 510 to access the PUF array 560.

During Handshaking, the server 502 issues a challenge 522 to the APG 510 of the client 505. This challenge 522 is used by the APG 510 to identify the portion of the devices belonging to the PUF array 560 to access. This challenge 522 may be a random number. In some embodiments, the server 502 and the client 505 may have access to the same random number generator or may have synchronized random number generators. In such embodiments, the server 502 does not need to transmit the challenge 522 to the client 505 in order for the client 505 to generate the challenge response 530 using the APG 510.

The measurement of characteristics of individual PUF devices may not be perfectly deterministic. As part of the Handshaking process, the server 502 may send additional information or instructions such as the instructions 525 to the client 505 for use in making generation of the challenge response 530 more reliable. Such information may include a checksum or other error-correcting information for use with error-correcting codes, or other information or instructions used in response generation schemes to be discussed later below. Upon receiving the challenge response 530, the APG 510 may use the additional information to generate corrected response or exclude unreliable devices belonging to the APG 560 from the response generation process. The server may determine that certain devices of the PUF array 560 are unreliable using the image 561 of the PUF array 560 and may transmit information identifying unreliable devices to the client 505. The client 505 may also independently determine that certain devices are unreliable such that both the server 502 and the client 505 agree on devices which should be excluded. Other error-correction methods may also be employed.

One approach for dealing with non-zero error rates entails repeated measurement of the characteristic(s) of the PUF devices forming a PUF array such as the PUF array 560. During Enrollment, the server may issue each possible challenge repeatedly and track the statistical distribution of values measured for each PUF device. The server may then determine that certain PUF devices are "unreliable" and should not be used to generate responses and store information to that effect. During Handshaking, the server may then transmit that information to the client or the client may already store similar or identical information. In such examples, the instructions 525 may transmitted the client 505 during handshaking for use in determining which devices to measure. For instance, the instructions 525 may include a list of locations in the PUF array 560 to exclude. In one example, this list of locations may be in the form of a string of bits or a bitmap (a "mask"), where each '1' value indicates that the corresponding cell should not be used. Applying an XOR operation to the mask and a corresponding string or bitmap representing cells identifying by the address 515 may be used to generate a new string or bit map identifying which cells are to be included and which are to be excluded. Lists, bitmaps, or other information suitable to identify devices whose characteristics should not be used may be referred to as "masking instructions."

The encryption scheme depicted in FIG. 5 is suitable for use with memristor-based PUF arrays according to embodiments herein. In some approaches using memristor-based PUFs or other resistive PUF devices, the server (or any other device storing enrollment information characterizing PUF arrays) has a look-up table that stores the reference resistance value of each cell in a PUF array. Typically, a predefined number of cells are selected for use in generating a key. In one example, 256 cells are randomly selected in order to generate a 256-bit cryptographic key. The resistance values may be used to generate a binary-valued key but comparing the resistance of each cell to the resistance of reference device measured under the same conditions (e.g., a device have a median resistance value for all the selected cells). In this example, ~128 of the randomly cells will have resistance values below the median value and will be assigned the value '0', while the remaining cells will be assigned the value '1'.

If the PUF devices are highly-reliable and not subject to drift, the cryptographic key generated by the server using information collected during enrollment (e.g., initial responses 130) will be identical to the key generated by the client by measuring the corresponding 256 cells in its resistive PUF array. A moderate mismatch rate between the two keys can be corrected by known schemes such as Error Correcting Codes (ECC) or Response Based Cryptography (RBC), as non-limiting examples.

In RBC, a small number of errors are expected in challenge responses (e.g., responses 530) generated by a client and/or encryption keys (e.g., keys 540) generated therefrom. If the server cannot successfully decrypt a message from the client, the server may perform a search for responses or keys that differ from the expected response or key by less than a predetermined Hamming distance or other suitable distance metric. If a match is found, the server will be able to reconstruct the actual response or key generated the client. Response-based cryptography methods are described in detail in U.S. Patent Publication 2020/0119932A1 (which has a common inventor with this Application), entitled "Response-Based Cryptography Using Physical Unclonable Functions." That application is incorporated by reference herein in its entirety.

Systems and methods disclosed herein are improvements over existing challenge-response methods for generating shared cryptographic keys using memristor-based PUF arrays and PUF arrays using similar technologies. As explained further below, advantages may include lower latency and lower power requirements. Reduced operation power may have the additional advantage of reducing the susceptibility of devices to attacks that rely on inferring information stored or generated by devices such as APGs by remotely sensing time-dependent power consumption patterns of such devices.

To enable these and other advantages, systems and methods disclosed herein systematically characterizing the behavior of PUF devices (e.g., memristors) rather than only measuring and storing a finite set of measurement values for each device. The characterized behavior of each device may be a function computed using measured characteristics of that device. For instance, a current-resistance transfer function (e.g., a transfer function using the Poole-Frenkel model as depicted in FIG. 4) may be computed for each memristor to produce what may be referred to as a physical unclonable computed function, (a "PUCF"). In the example of a Poole-Frenkel model and similar models, a PUCF may have multiple degrees of freedom allowing a quasi-infinite of characteristic values for each device. Specifically, each memristor in memristor-based PUF array may have a different computed response for each possible combination of input current and operating temperature, which may be predicted using a small number of parameter values such as values of the parameters $\{R_0, E_0, A_0\}$ of the Poole-Frenkel model and temperature as discussed above in connection with FIGS. 2-4.

Figure 6:
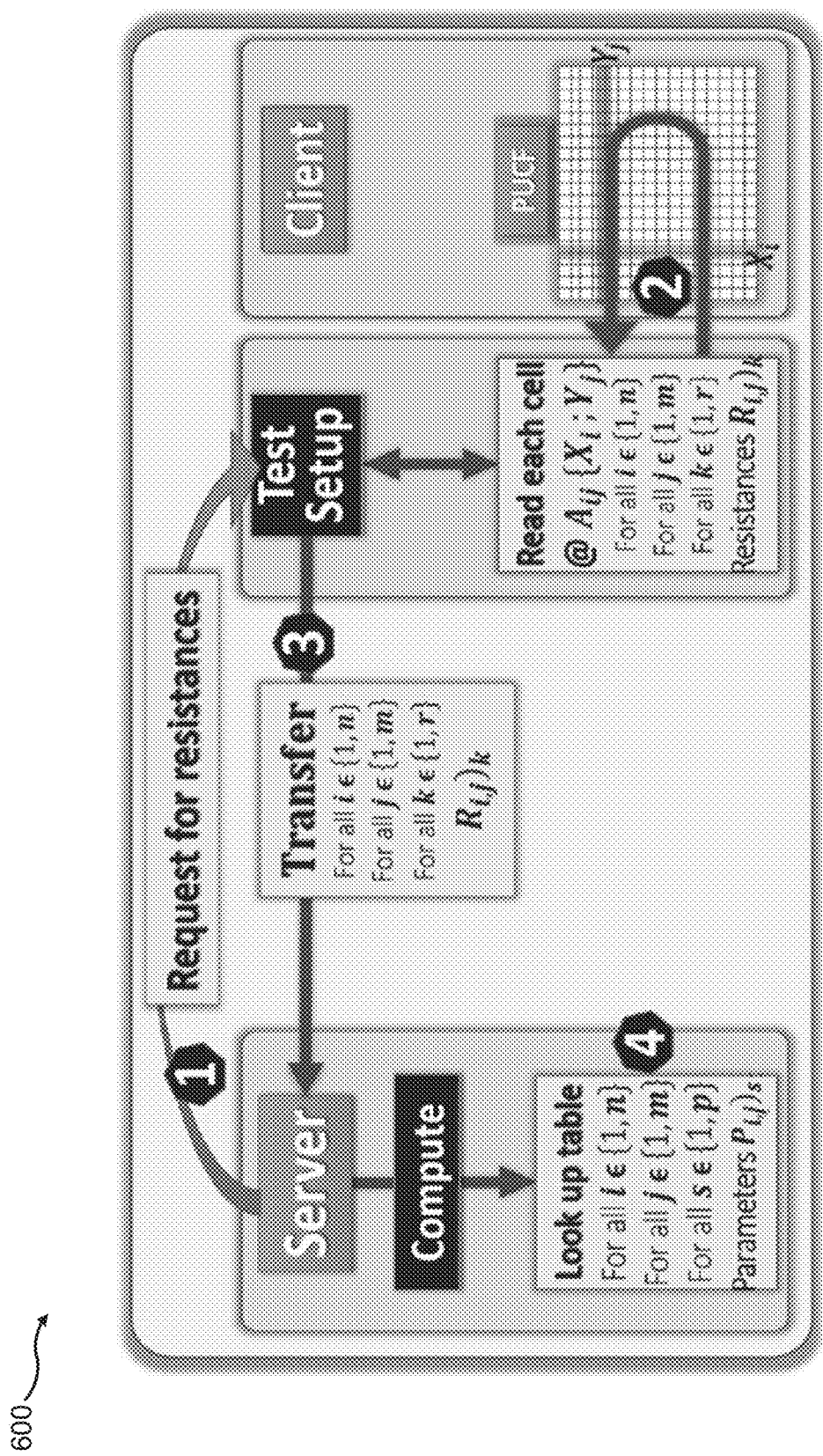
FIG. 6 depicts elements of an enrollment process for memristor-based APGs according to embodiments herein.

FIG. 6 illustrates elements of an example PUCF Enrollment process 600 for a scheme in which the current-resistance transfer characteristics of individual memristor at various current levels are used as PUF characteristics. Enrollment of each PUF array is performed in a secure environment before a client device (e.g., a client 105, 305) first handshakes with a server (e.g., server 102, 502). The memristor arrays are characterized, specifically the ephemeral resistance values, and the resulting data is downloaded in protected look-up tables. These are used by the server to generate both the initial responses of the PUF (e.g., initial response 130) and to create instructions sent to client devices during handshaking (e.g., the challenge 522 and any additional instructions 525). To derive the PUCFs, the initial responses are computed with the data acquired during enrollment cycle and stored in the look-up table. The complexity and power consumption of the client devices can be limited by excluding circuitry needed to measure devices for enrollment purposes by using separate measurement equipment (e.g., the "test setup" of FIG. 6).

The example PUCF enrollment process 600 begins (at the step labeled '1') with the server requesting resistance measurements from a test fixture (the "test setup") directly connected to a client device (or an APG which will eventually be installed within the client device). During this operation, the memristor array is accessed using the test fixture. In some examples, the test fixture may be configured to interface with dedicated enrollment circuitry associated with the APG to allow fast characterization of the entire APG during enrollment. The test fixture may use relatively high-power circuitry to accurately measure large resistance values. The enrollment circuitry may also be configured to allow many responses to be measured in parallel. To enhance security, the enrollment circuitry may be destroyed or disabled (using fuse or antifuse technology, as non-limiting examples) after the enrollment process to prevent an attacker from mimicking the enrollment process.

Next (at the step labeled '2') ephemeral resistances of the memristor (in the range of ~100 kΩ to 25 MΩ) are measured using high accuracy circuitry (part of the test setup) with injected currents varying from 10 nA to 10 µA at ambient temperatures ranging between ~−50° C. and 140° C. Each cell, labeled $A_{ij}$, located at an address $\{X_i; Y_i\}$ in the memristor array is read n times (e.g., one thousand times) to generate n resistance values denoted $R_{ij}^k$ where $k \ni \{1, n\}$. The raw resistance values $R_{ij}^n$ are transferred to the server (or to any other suitable device) for processing.

The raw resistance values $R_{ij}^n$ are processed (at the step labeled '3') and stored (at the step labeled '4') to produce an image of the memristor array (e.g., the image 561) that may be used to independently generate PUCF responses to challenges issued by the server to client devices. The lookup table (i.e., the image of the array) stores a set of p parameters $P_{ij}^m$ at each address where $m \ni \{1, p\}$. As illustrated by FIG. 3, a small number of parameters may be used to retrieve a much larger number of possible resistance values (corresponding to different input currents, for example). As a non-limiting example, approximately one hundred times less information is needed to store a set of parameters for one device than would be required to store a sufficient number of resistance measurements to represent the current-resistance transfer response of the same device.

The raw data generated during enrollment, consisting of multiple ephemeral resistance values per cell, is processed before storage. Several models have been proposed to describe the conduction of electrons through ReRAM or memristor cells. Below, the Poole-Frenkel (P-F) model is described as a non-limiting example of how raw resistance data may be represented by computing values of a model function. The Poole-Frenkel equation $\mathcal{F}_{PF}(I,T)$ has the three adjustable parameters $\{R_0, E_0, A_0\}$, and is used to model the dependence in ephemeral resistance R on the injected current I and the ambient thermal energy kT, where k is the Boltzmann constant:

$$\{I, T\} \to R = \mathcal{F}_{PF}(I, T) = R_0 e^{\frac{E_0 - \sqrt{A_0 I}}{kT}} \quad \text{(Eq. 1)}$$

Using this model at a constant temperature, a graph showing the ephemeral resistance on a logarithmic scale as a function of the square root of the current should be a straight line. The variations in resistance as a function of the square root of the injected current (in the 100 nA to 1.6 µA range) for three memristor cells (in green, blue, and orange) are shown in FIG. 3. These three cells are representative of an entire population of cells in memristor arrays.

As shown in FIG. 4, the deviations from straight lines are small, thereby validating the model. To minimize deviations of modeled resistance values from observed resistance values over wide ranges in input current, a piecewise fit can be performed where the parameter values $\{R_0, E_0, A_0\}$, describe the 100-400 nA range, and the parameter values $\{R_0', E_0', A_0'\}$ describe the 400-1,600 nA range, as an example. The activation energy values, $E_0$ and $E_0'$ are extracted separately by measuring the effect of temperature. In this example, measurements of each cell at numerous currents and temperatures can be replaced by six parameters values. This method can also model the resistance of the cells for any injected current I between 100 nA and 1.6 µA, even cells that were not characterized during enrollment.

Other models in which a current I corresponding to the voltage variation ΔV applied to a memristor cell can be used to compute a set of parameters describing the behavior of memristor devices physical parameters, such as the Butler-Volmer model which results in the following equation:

$$I = I_0 \left[ e^{\frac{A_0 \Delta V}{kT}} - e^{\frac{B_0 \Delta V}{kT}} \right] \quad \text{(Eq. 2)}$$

In embodiments using a Butler-Volmer model, the test setup would apply repetitive voltage stresses across each cell to measure corresponding currents during enrollment rather than applying current and measuring voltage. This methodology is similar to the one described with the P-F model except that the parameters stored in the look-up table become $\{I_0, A_0, B_0\}$ and a client device would measure resistance (i.e., a current level indicating resistance) by applying a specific voltage to each device rather than a specific current.

Figure 7:
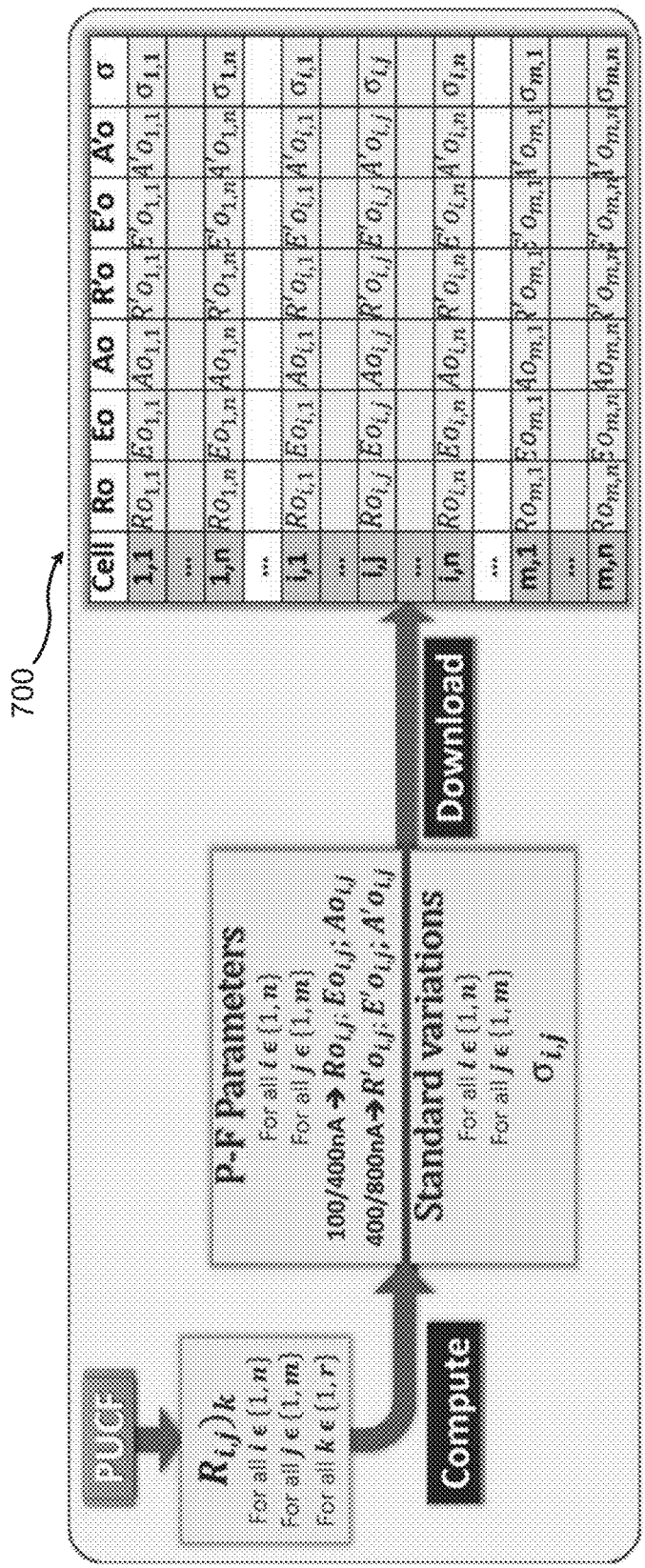
FIG. 7 depicts example enrollment data according to embodiments herein.

FIG. 7 shows an example table suitable for use as an image of a memristor PUF array (e.g., the image 561 of the PUF array 560) for generating PUCF responses according to the example process 600 of FIG. 6. As shown, for each cell indexed by {m, n}, seven parameters are stored: $\{R_0, E_0, A_0\}$ and $\{R_0', E_0', A_0'\}$, described above in connection with FIG. 4, as well as σ. The parameter σ is the standard deviation of the resistance values of each device when measured repeatedly at a single current. In some embodiments, multiple σ values, each corresponding to different current and/or temperature conditions may be stored for each device. In some embodiments, only one set of Poole-Frenkel parameter values $\{R_0, E_0, A_0\}$ or other similar values (e.g., corresponding to another suitable model) are stored for each device. In other embodiments, more than two such sets of parameters may be stored, each set corresponding to a different range of measurement currents or other conditions. The standard deviation values ($\sigma_{ij}$) may be used to mask (i.e., remove) the "unreliable" cells from being used for key generation, as described further below.

After the enrollment cycle and in preparation for any cryptographic cycles, both the server and the client device independently generate the same secret cryptographic keys. The method to generate these keys at the server level from the look-up tables is described here, while the handshake between communicating parties and the key generation at the client level from the PUCF, is described below.

Figure 8:
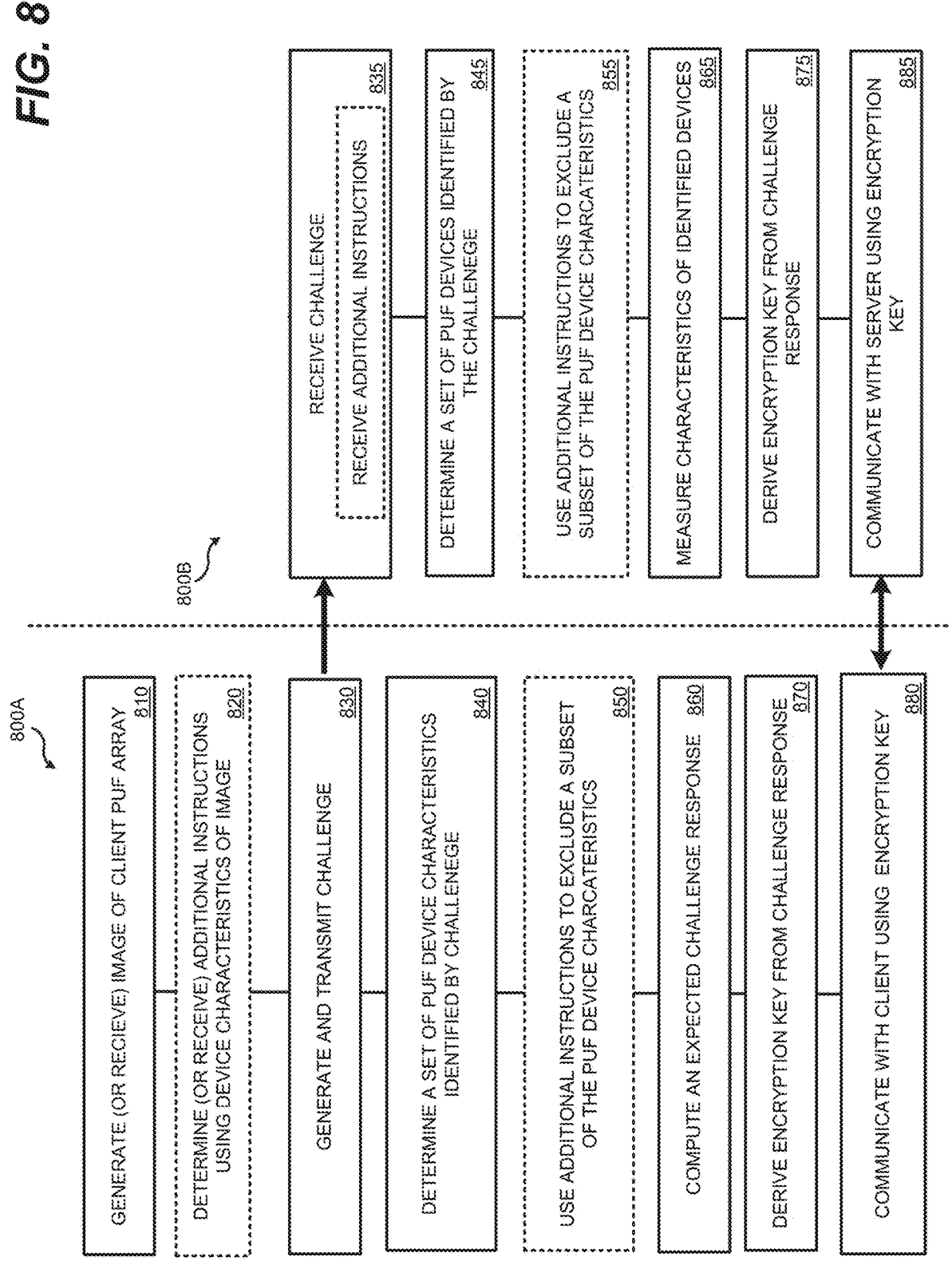
FIG. 8 depicts example processes performed by a server and a client to jointly generate a shared encryption key according to embodiments herein.

FIG. 8 illustrates example processes 800A and 800B performed to enable, respectively, a server and a client to communicate using a shared encryption key (e.g., a key 540) according to embodiments herein. Process 800A, performed by the server includes the steps 810, 820, 830, 840, 850, 860, 870, and 880. Process 800B, performed by the client includes steps 835, 845, 855, 865, 875, and 885. The keys (e.g., keys 540) generated independently according to processes 800A, 800B can be used to communicate through symmetrical encryption schemes such as AES. Both communicating parties can generate public keys from the secret keys with asymmetrical schemes such as ECC and RSA. A server and client can complete multiple transactions (e.g., handshakes). For each transaction, the cryptographic process is repeated with a new challenge to pronounce a new cryptographic which is essentially a one-time key. Elements of the process 800A are explained in further detail below in connected with FIG. 10. Elements of the process 800B are explained in further detail below in connected with FIG. 11.

Before the client and server can communicate, the server needs to be able to access an image (e.g., the image 561) of the client's PUF (or PUFC) array (e.g., the PUF array 560). The process 800 begins at 810. At 810 the server generates (or receives) and image of the client's PUF array. The image contains information about the measured physical characteristics of the client PUF array sufficient to reconstruct expected responses to challenges by the client. It will be understood that step 810 may be performed ahead of time as party of a client enrollment process as discussed above.

At 820 the server optionally determines (or otherwise receives) additional instructions (e.g., instructions 525) based on the characteristics stored in the image. As an example, additional instructions may identify devices that are unreliable or should otherwise be excluded from use to generated challenge responses. In another example, the additional instructions may be other error correction information (ECC or parity information as non-limiting examples). Again, it will be understood that step 820 may be performed in advance of a communication session with an enrolled client device.

At 830, the server generates a challenge and transmits it to the client. If the server generated or received additional instructions at 820, then these additional instructions may be transmitted to the client along with the challenge. In some embodiments, the server may not need to transmit the challenge to the client. For instance, the client and server may have access to a shared random number generator or may have independent synchronized random number generators. In such embodiments, the client and server may use shared random numbers as the challenge. In alternative embodiments, the client 800B may initiate the communication session by pinging the server or otherwise sending an access or communication request, which then prompts server 800A to issue the challenge in step 830.

At 840, the server determines a set of PUF device characteristics identified by the challenge and at 850 the server optionally uses additional instructions to exclude some of the identified devices. In some embodiments, the server may use the additional instructions or other instructions stored by the server to use characteristics of additional PUF devices instead of the characteristics that were excluded.

At 860, the server computes an expected response to the challenge using the characteristics identified at 840 (and optionally modified at 850) and at 870 the server derives an encryption key from the expected challenge response (which is generated, again, from stored data that was derived from the client device during enrollment). Finally, at 880, the server communicates with the client device using the encryption key generated by the client, which has also generated the same encryption key using the process 800B, for example.

In some embodiments, the server may also use error-correction techniques to ensure that the server can identify the encryption key generated by the client (or otherwise decrypt communication on the basis of the key generated by the client). Response Based Cryptography (RBC) and/or ECC techniques may be used, as non-limiting examples.

The example process 800B performed by the client begins at 835, where the client receives the challenge generated by the server and optionally receives additional instructions (e.g., instructions 535). At 845, the client determines a set of PUF devices in a PUF array of the client (e.g., a PUF array 160, 560).

At 855 the client optionally uses additional instructions to exclude a subset of the devices and at 865, the client measures characteristics of the devices identified art 845 (and optionally modified at 855). At 875 the client device derives an encryption key using a challenge response generated using the device characteristics measured at 865). Finally at 885, the client device communicates with the server using the encryption key (e.g., a key 540) generated at 885.

Figure 9:
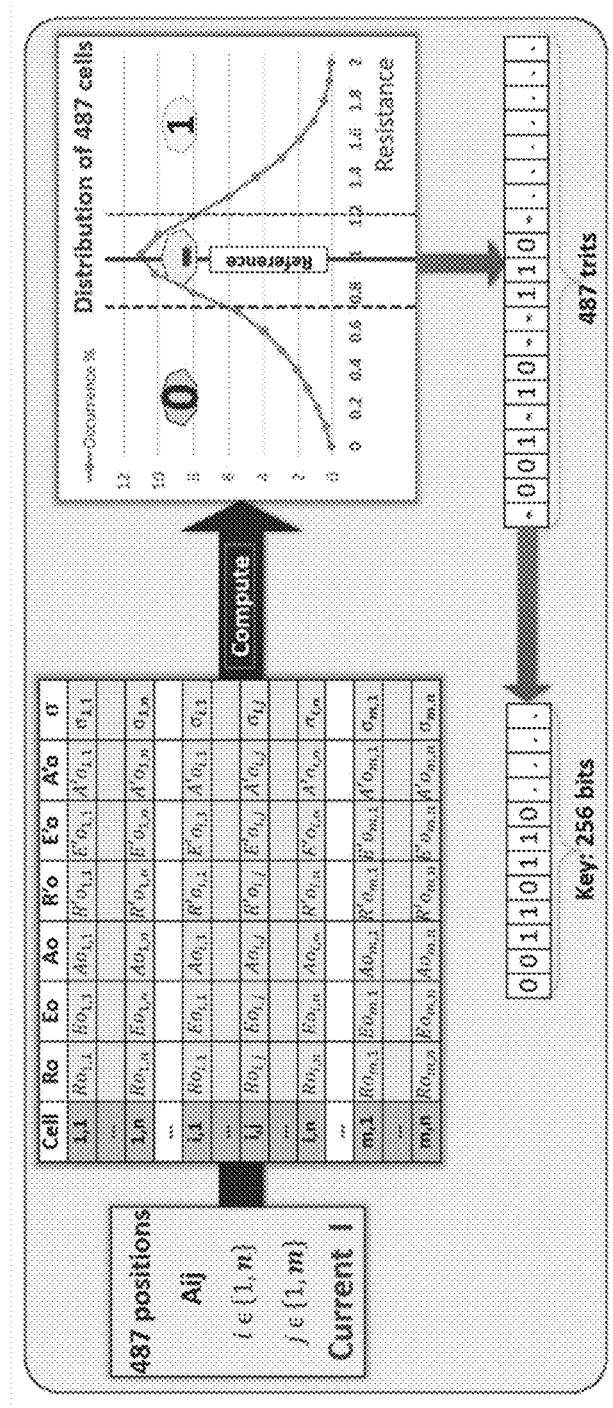
FIG. 9 depicts a process suitable for use in embodiments herein for selecting memristor devices having a reliable resistance values and generating bit values of an encryption key corresponding to each selected device.

FIG. 9 illustrates a process 900 for computing the values of a cryptographic key (e.g., a key 540) based on resistance measurements. In this example, the characteristics of 487 devices are identified. Using a suitable Poole-Frenkel model or any other suitable model, the expected resistances of all 487 devices are computed and a distribution of those resistances is also computed. The resistances are compared to a suitable reference resistance. As an example, the reference resistance may be a median resistance belonging to the 487 calculated resistances. If the desired cryptographic key length is 256-bits, then the 230 resistance values closest to the median value and the median value (231 resistance values in total) may be excluded, leaving 256 values that are significantly different than the reference value, i.e., either significantly higher or significantly lower as they are outside of the cutoff values depicted in FIG. 9. For selected devices or cells that have resistance values that are higher than the median resistance, a '1' is assigned; for selected devices or cells with a resistance below the median resistance, a '0' is assigned. In some embodiments, the excluded values may be chosen such that the resulting cryptographic keys always contain an equal number of '0' values and '1' values.

Other methods for key generation are possible, and the exemplary method above may be modified. For example, in certain embodiments, outlier cells with very high or very low resistance may be excluded. In certain embodiments, the key may be generated from resistance values that are all above or all below some resistance threshold, where '0' and '1' values are assigned depending on the distance between the particular value and the threshold. Rather than choosing a median resistance value as a reference, some other arbitrary resistance value in the array may be chosen.

Figure 10:
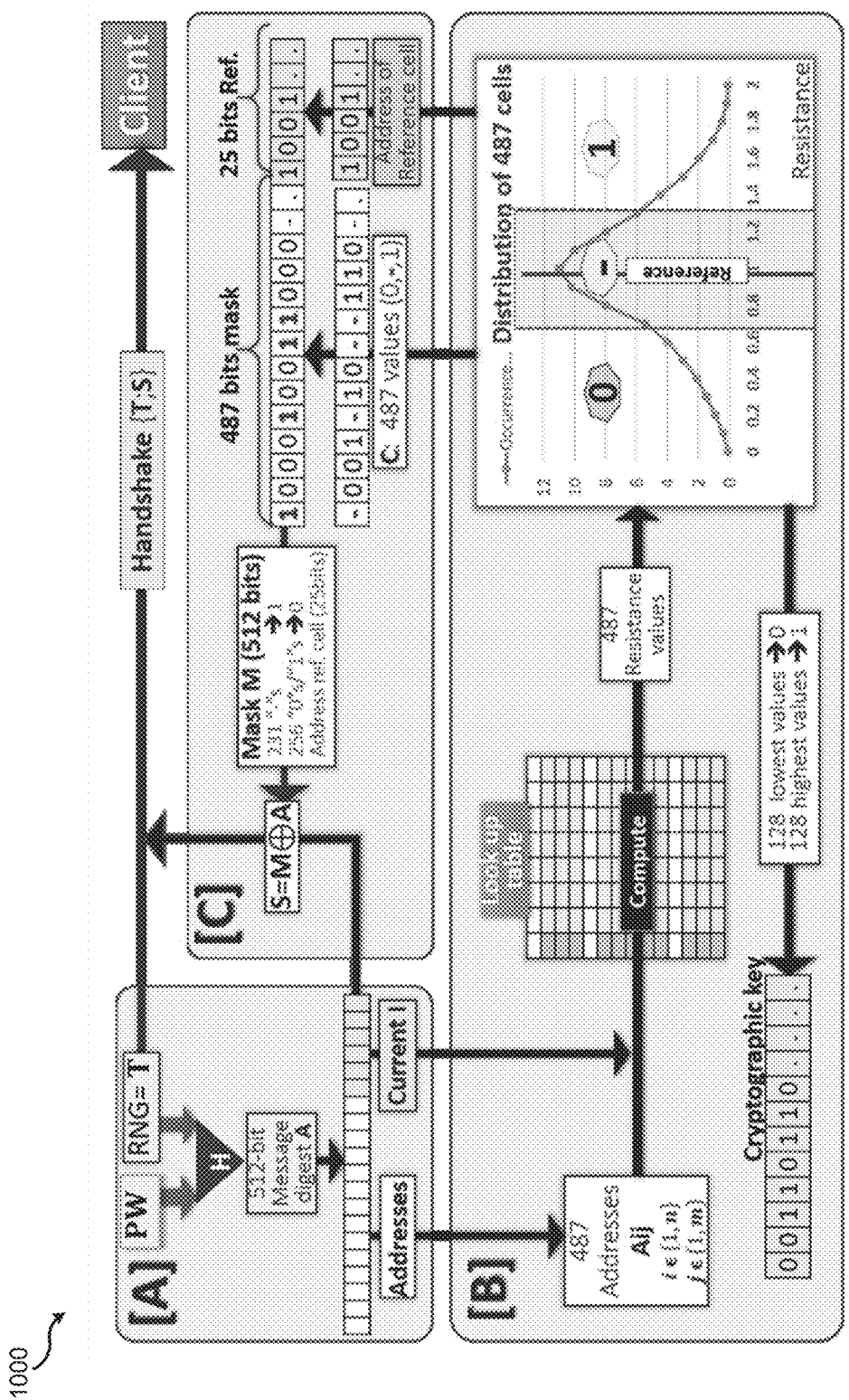
FIG. 10 is a block diagram illustrating a server transmitting a handshake to a client device to cause the client device to generate an encryption key and independently generating the same encryption key according to embodiments herein.

FIG. 10 illustrates an example process 1000 performed according to embodiments herein by a server (e.g., a server 102, 502) to generate an encryption key and transmit a challenge to a client (e.g., a client 105, 505) causing the client to independently generate the same encryption key.

First, the server generates a challenge. The challenge (a random number 'T' in this example) is combined with a password and a hashing function (e.g., the hashing function 512) is used to produce a message digest. For example, the random number 'T' is concatenated with a password 'PW' and then hashed to generate a message digest 'A' (e.g., the message digest 524a). The message digest ('A') is used to generate a set of addresses in the look-up table (e.g., the image 561 of the PUF array 560, and/or the lookup table 700). In this example, the digest is decomposed into a first portion that indicates the set of address and a second portion that indicates a desired measurement current I to be used in the computations. The server can use model parameters in the lookup table (e.g., the table 700) to calculate the expected resistance values for each identified PUF device at the desired measurement current according to any suitable model (e.g., a multiple current range Poole-Frenkel model as discussed above). For instance, if the message digest is 512-bits long as shown, 487 bits may be used to identify an address or range of addresses in the lookup table and 25 may be used to identify the desired measurement current. In some embodiments, an additional portion of the digest (or subset of either of the first or the second portion of the digest) may also be used to identify a reference device.

The server may compare the modeled resistance of each device to the resistance of a reference device (or another suitable reference resistance value) to assign bit values for use in ultimately generating a cryptographic key. As shown in FIG. 9, the server computes modeled resistances for 487 devices at the measurement current selected. The server then assigns a binary '1' to values that are higher than the resistance of the reference cell (or other suitable reference resistance) by more than a predetermined amount and assigns a binary '0' value to resistances less than the reference resistance by more than a predetermined amount. Devices that have resistances that are close to reference resistance may be treated as unreliable and identified for exclusion from the expected challenge response and the resulting cryptographic key (e.g., a key 540).

In the example process 1000 of FIG. 10, the cryptographic key is 256-bits long. If the message digest is 512-bits long and then number of devices excluded is fewer than 256, the server may be configured to select the first 256 devices that are not excluded or to use any other suitable method to generate cryptographic key of the desired length. As will be discussed in connection with FIG. 10, the client may be configured similarly when generating the same cryptographic key using the same method as the server. Alternatively, in some embodiments, the server may receive additional instructions (e.g., the instructions 525) or other suitable information enabling the client to select the same 256 device characteristics to generate the key. As shown in FIG. 9, the server may transmit a mask (e.g., as all or part of instructions 525) to the client identify device characteristics to exclude from key generation. In some embodiments, the server may transmit a bitstream ('S'), such that S=M⊕BA, where 'M' is a bitstream representing the mask and 'A' is the message digest.

Figure 11:
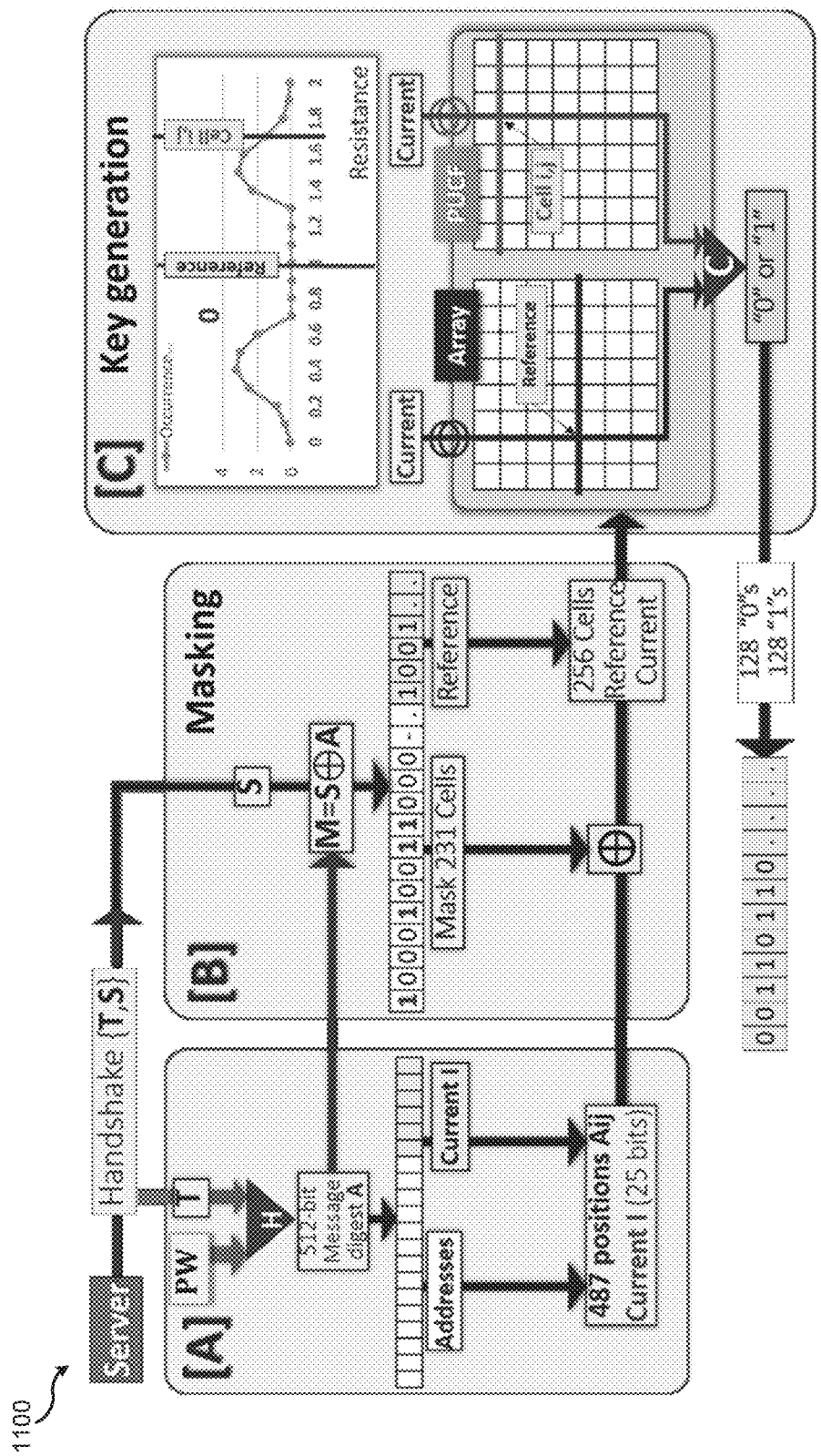
FIG. 11 is a block diagram illustrating a client device receiving a handshake from the server of FIG. 10 and independently generating the encryption key in response to the handshake according to embodiments herein.

FIG. 11 illustrates an example process 1100 performed according to embodiments herein by a client (e.g., a client 105, 505) in response to receiving a challenge (e.g., challenge 522) from a server in which the client generates or derives an encryption key (e.g., key 540) from a set of responses to the challenge (e.g., responses 530). The client receives a challenge (a random number, e.g., a challenge 522) from the client and a masking instruction. The client generates a message digest ('A') using a password and the challenge. The client also generates a mask ('M') from the masking instruction ('S') by computing the XOR of the instruction (e.g., instructions 525) with the digest.

The client uses the digest to identify devices in its PUF array (e.g., a PUF array 160, 560) to measure and a reference device to measure. The client may also use the digest to identify a desired current I at which to measure the devices selected for use in generating a cryptographic key (e.g., a key 540). In this example, the digest is used to identify 487 devices eligible for use in generating a 256-bit long key. The client excludes 231 devices identified by the mask. A bit in the cryptographic key may be assigned a '0' or a '1' value depending on whether the resistance of the corresponding device is lower ('0') or higher ('1') than the resistance of the reference cell or vice versa.

Figure 12:
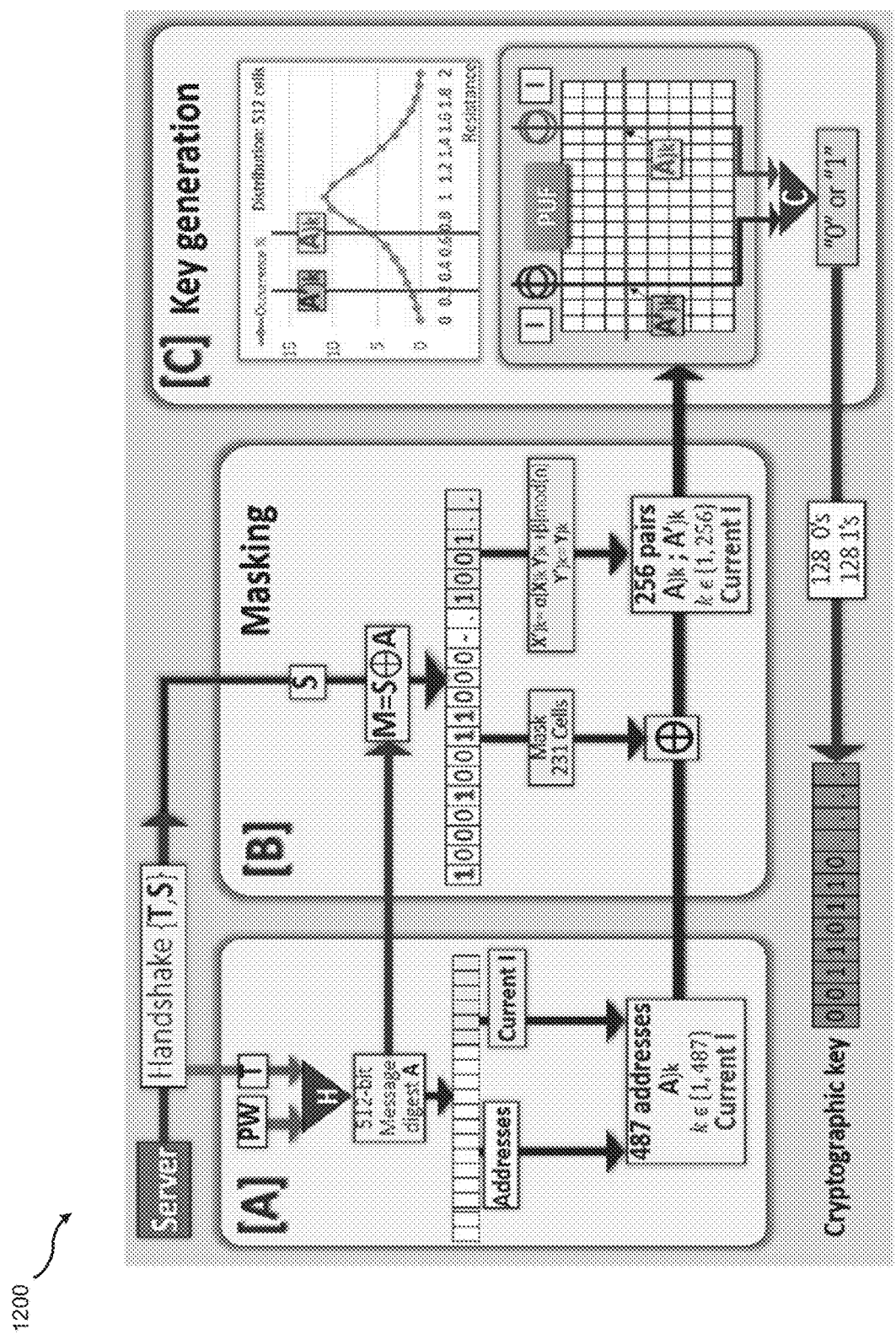
FIG. 12 is a block diagram illustrating a client device receiving a handshake from the server of FIG. 10 and independently generating the encryption key in response to the handshake according to an alternative embodiment.

In some embodiments, rather that comparing the resistance of each selected PUF device to a single reference resistance, the client instead performs pairwise comparisons wherein each bit of the cryptographic key corresponds to the result of comparing the resistance of a unique pair of PUF devices, as in an example process 1200 illustrated by FIG. 12. The process 1200 is similar to the process 1100. For instance, in the example process 1200, 487 candidate cells are identified by the challenge, similarly to the example process 1100. However, in the example process 1200 a companion (reference) cell is identified for each of the 487 candidate cells and the client compares the resistance of each of the 487 candidate cells denoted by its address $A_k$ with its companion cell denoted by its address $A_k'$ where $k \ni \{1,487\}$. The companion cells may be offset from the candidate cells by a predefined number of address or the offsets may be chosen randomly to increase the entropy of the key space.

Each address can be represented with a word line address and a bit line address; i.e., $A_k=\{X_k, Y_k\}$. In some embodiments, each cell $A_k$ and its companion cell $A_k'$ share a word line. Such embodiments have the advantage of allowing simultaneous access to both devices using conventional memory architectures. In this case, the companion cell is located at $A_k'=\{X_k', Y_k\}$. In one example, the bit line of each companion cell $X_k'$ can be expressed as $X_k'=\alpha[X_k+\beta]$ mod (n), where n is the number of bit lines. Both parameters $\alpha$ and ß may be random numbers which may the client may receive from the client, either as part of the challenge (e.g., the challenge 522) or as part of additional instructions (e.g., instructions 525). Alternatively, in other embodiments, the client and the server may access the same random number generator or use synchronized random number generators to independently generate the same random numbers. In still other embodiments, the client may select random numbers to determine the candidate cell locations independently and the server may use response-based cryptography (RBC) techniques to successfully identify the companion cells chosen by the client. Doing so may be computationally intensive, providing additional security.

Analogously to the process 1100, a client executing the process 1200 may assign values of the cryptographic key (e.g., a key 540) based on differences between the resistance $R_k$ of each candidate cell and the resistance $R_k'$ of its companion cell. As one non-limiting example, pairs of cells having the largest positive values of $(R_k-R_k')$ may be assigned '1' value and pairs of cells having the largest negative values of ($R_k$–$R_k'$) may be assigned '0' values. It will be understood, however, that any suitable scheme for assigning values may be used.

The techniques above, including the pairwise measurement technique illustrated by FIG. 12, may be used to dramatically increase the number of possible challenge-response pairs (CRPs) without significantly increasing the time required to perform an enrollment or the amount of information a server must store as a PUF image (e.g., an image 561 of a PUF array 560). For example, if a memristor-based PUF array (or any other array of suitable PUF devices) contains one million cells (1,000 rows, 1,000 columns) that are read 100 times during enrollment, each read lasting 1 μs, the time required to image the array during enrollment is ~100 seconds. Meanwhile, the number of possible unique sets of 487 cells in such a one-million-cell array is ($_{487}1,000,000$) which is effectively infinite. If a 1000×1000 array is addressed in two dimensions using bit and word line addresses, there are also 999 possible reference cells for each of the 487 selected cells. Varying the measurement current provides yet another degree of freedom, increasing the possible permutations by the number of possible current values (which may easily be chosen to be several hundred or more).

Using these multiple degrees of freedom (location and number of cells selected, number and choice of masked cells, choice of reference cell for each measured cell, and measurement current), suitably high entropy may be achieved with relatively compact PUF arrays. For example, an 8-kB memristor array addressed using 256 bit line and 256 word lines may be enrolled in approximately 6 seconds. Meanwhile, the number of possible sets of 487 cells, ($_{487}65,536$), is still effectively infinite for practical purposes.

Performing comparative resistance measurements as described above has advantages, particularly when the resistances of measured devices (e.g., memristors or other resistive memory elements) are relatively high (e.g., in the single-to-multi MΩ range). Measuring large resistances with sufficient accuracy to distinguish between small differences in absolute resistance is typically slow due to the low currents involved for power efficient and non-destructive measurement. Measurement speed may be improved by using higher currents but this leads to high power consumption and it is desirable that client devices be relatively low-power (e.g., so that they may be compact battery-powered devices with long battery life). The differential methods described above use comparative measurements which only require determining whether one resistance is larger than another to generate a binary output (a '1' or a '0') may be much faster without requiring high power consumption.

In addition, high power dissipation during measurement may result in the client device being vulnerable to attacks that remotely sense power consumption by measuring dissipated heat or magnetic fields generated by electrical currents. Memristor devices and other resistive devices may also experience temperature drift (see the exponential dependence of resistance on temperature in the Poole-Frenkel model and similar models). Devices in a PUF array will tend to drift together when subjected to changes in temperature. Accordingly, comparative resistance measurements will not tend to be affected by temperature effects. Accuracy can be further increased by using masking as described herein to ensure that only devices having the largest resistance differences from the reference device are used. In addition, the choice of a suitable reference resistance value and exclusion of a suitable number of devices can ensure that cryptographic keys each have equal or nearly equal distributions of '0' values and '1' values, making statistical attacks on the key less likely to be effective.

Figure 13:
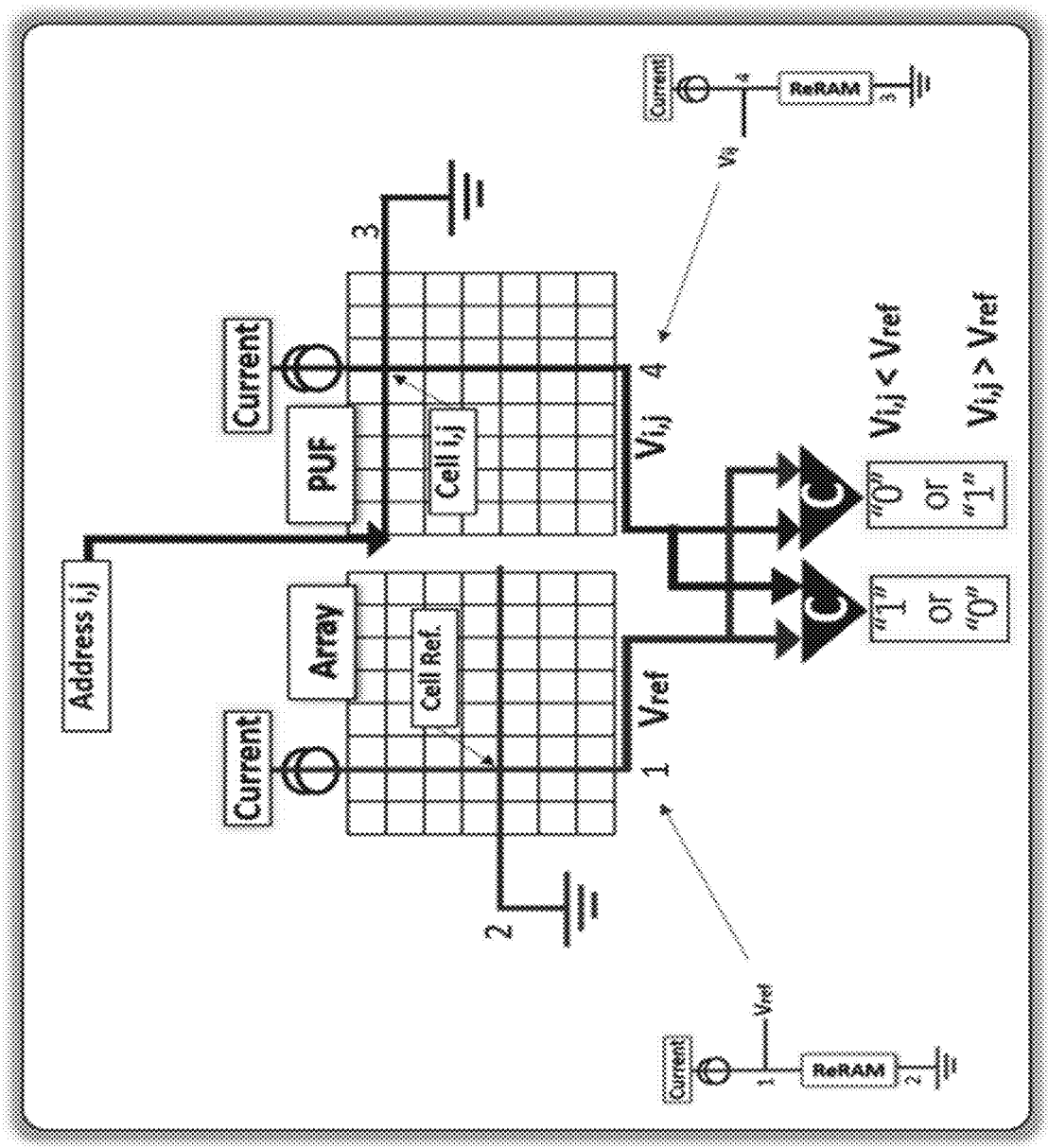
FIG. 13 is a block diagram of a complementary comparator circuit suitable for use in embodiments herein.

Additional techniques may be applied to further reduce the susceptibility of APGs to attack. For example, readout circuitry for the APG of a client device may configured to measure both a comparison value ('0' and '1') and the complement of this value for each bit of a cryptographic key, as illustrated by FIG. 13. Doing so may be used to ensure that the overall power signature (and/or related electromagnetic signatures) of the APG is similar regardless of whether the APG has generated a '1' or a '0', further protecting against statistical power-monitoring attacks.

In some embodiments, both outputs of a complementary comparator as shown in FIG. 13 may be used to provide additional security. For example, a client may transmit the same message, separate portions of the same message, or two messages using a key (e.g., a key 540) generating using challenge responses (e.g., responses 530) of the client's APG (e.g., an APG 210 with a PUF array 160, 560). These messages or portions thereof may contain information known to the server in advance or may be related in such a way that the server can derive the expected content of one message from the other. In these examples, if both messages (or portions) are successfully decrypted by the server using the key as derived by the server using an image of the client's PUF array (e.g., an image 561 of a PUF array 560), then the server can ascertain that the client's APG has not been tampered with or otherwise damaged.

It should be understood that, although cryptographic keys are described herein as binary-valued keys, methods described herein may be modified to assign values in higher radices. For example, ternary values may be used. For example, rather than excluding resistance values that are too close to a reference value, a third value may be assigned to these resistances. Similarly, resistances may be broken up into more than three ranges and assigned values in a quaternary (or greater) radix.

It should be understood that, unless explicitly stated or otherwise required, the features disclosed in embodiments explicitly described herein and elsewhere in this disclosure may be used in any suitable combinations and using various suitable parameters. Thus, as a non-limiting example, any method described herein or any other suitable method may be used to determine measurement parameters of for measuring the characteristics of PUF device. As a non-limiting example, key lengths, numbers of devices identified by a challenge (and numbers of devices to be excluded or "masked"), digest lengths, the size of PUF arrays used, and other parameters may be varied as desired for different applications. It should also be understand that while memristor-based PUF devices are discussed in the examples herein, they are intended as non-limiting examples of suitable PUF technologies.

The invention claimed is:

1. A system, comprising:
   a processor, a physical-unclonable-function ("PUF") array of PUF devices, and memory coupled to the processor, the memory storing non-transitory, processor executable instructions that, upon execution by the processor, cause the processor to:
   receive a challenge message from a server device;
   extract, from the challenge message, addresses of a set of identified devices of the PUF array;
   measure resistance values of the set of identified devices, the set of identified devices including at least one reference device;

generate a cryptographic key by assigning values corresponding to each identified device based on comparing a resistance value of each identified device to a resistance value of a corresponding reference device, the reference device having a different address as the identified device; and send a message encrypted with the cryptographic key with the server device.

2. The system of claim 1, wherein execution of the instructions further causes the processor to:

receive masking instructions that identify addresses of masked devices in the PUF array; and exclude the masked devices from the set of identified devices.

3. The system of claim 2, wherein the set of identified devices includes:

a first subset wherein the resistance value of each of the identified devices of the first subset has a resistance value greater than the resistance value of the corresponding reference device; and a second subset wherein the resistance value of each of the identified devices of the second subset has a resistance value less than the resistance value of the corresponding reference device.

4. The system of claim 1, wherein execution of the instructions further causes the processor to identify, using the challenge message, a location of the companion device for each identified device.

5. The system of claim 1, wherein an electrical resistance value of each PUF device of the PUF array is related to current applied to that PUF device by a non-linear function; and wherein execution of the instructions further causes the processor to extract, from the challenge message, a level of current to apply to each identified device and the companion device of that identified device.

6. The system of claim 1, wherein comparing the resistance value of each identified device to the resistance value of the corresponding reference device, the reference device having a different address as the identified device, includes differencing the resistance value of the identified device with the resistance value of a PUF device at an address in the PUF array that is offset from the address of the identified device by a number of addresses identified using the challenge message.

7. The system of claim 1, further comprising readout circuitry configured to generate the values corresponding to each of the identified number devices and to simultaneously generate values that are complementary to the values assigned to each of the identified devices.

8. A system, comprising:

a processor, and non-transitory memory coupled to the processor, the memory storing data corresponding to addresses in a physical-unclonable-function ("PUF") array of PUF devices, and for each address, parameters suitable for use as inputs to a mathematical model predicting a physical characteristic of a device in response to a predetermined stimulus, the parameters having been calculated on the basis of previously taken sample measurements of the devices in response to a range of predetermined stimulus, the memory further storing executable instructions that, upon execution by the processor, cause the processor to:

generate a set of addresses corresponding to a set of PUF devices in the PUF array;

for each address in the set of addresses, supplying, to the model, a data parameter reflecting a predetermined stimulus and receiving, from the model, an estimate of a physical characteristic of a PUF device identified by that address of the PUF array in response to the predetermined stimulus; and generate a cryptographic key on the basis of the estimated physical characteristic for each PUF device of the set of PUF devices.

9. The system of claim 8, wherein the executable instructions, upon execution by the processor, further cause the processor to generate a challenge message containing data capable of being used to extract addresses of the set of PUF devices in PUF the array and communicate that challenge message to another device.

10. The system of claim 8, wherein:

the PUF array is an array of memristors;

the physical characteristic is electrical resistance; and the predetermined stimulus is an applied current.

11. The system of claim 8, wherein the generated cryptographic key includes values indicating whether each calculated physical characteristic for each PUF device corresponding to the set of addresses is above or below a predetermined reference value for that device.

12. The system of claim 8, wherein generating the cryptographic key includes:

receiving an encrypted message from another device having access to the PUF array;

determining that the encrypted message cannot be successfully decrypted using an initial key generated on the basis of the calculated physical characteristic for each PUF device of the set of PUF devices; and applying an error correction algorithm to the initial cryptographic key to produce the cryptographic key that may be used to successfully decrypt the message.

13. The system of claim 12, wherein the error correction algorithm is one of:

an error-correcting code (ECC) algorithm, a parity-checking algorithm, a fuzzy extraction algorithm, a helper data algorithm, or a response-based cryptography (RBC) algorithm wherein the system produces, as the cryptographic key, an alternative key that differs from the initial key by less than a predetermined maximum Hamming distance.

14. A method of generating symmetric cryptographic keys comprising:

at a first device, generating a first key by determining a plurality of predicted physical response characteristics of a plurality of identified devices in a physical-unclonable-function ("PUF") array of PUF devices in accordance with a mathematical model associating physical response characteristics of PUF devices in the array in response to a predetermined stimulus, wherein the first device is not in possession of the PUF array; and at a second device in possession PUF array, generating a second key by applying the predetermined stimulus to the plurality of identified devices in the PUF array and measuring a plurality of physical response characteristics of the plurality of identified devices in the PUF array.

15. The method of claim 14, wherein the generating the first key further comprises constructing a model by measuring physical response characteristics of the PUF devices of the PUF array in response to the predetermined applied stimulus.

16. The method of claim 15, further comprising:
receiving data regarding physical response characteristics of the devices to predefined stimulus for at least one level of the predefined stimulus;
fitting the data regarding the stimulus and the data regarding the physical response characteristics to the mathematical model associating the physical response characteristics of the PUF devices in the array in response to the predetermined stimulus; and
and storing information sufficient to define the model.

17. The method of claim 16, wherein the first device is a server device and the second device is a client device having the PUF array.

18. The method of claim 17, wherein the server device measures the physical response characteristics of the array of PUF devices on the client in a secure communications environment.

19. The method of claim 14, wherein the PUF devices are memristors and the physical response characteristics are electrical resistances developed in response to the application of electrical current.

20. The method of claim 19, wherein the model is one of a Poole-Frenkel or Butler-Volmer model.

\* \* \* \* \*